(12) United States Patent
Morrison et al.

(10) Patent No.: US 9,434,011 B2
(45) Date of Patent: Sep. 6, 2016

(54) COOLANT SPRAY NOZZLE AND CUTTER WITH COOLANT SPRAY NOZZLE

(71) Applicant: Kennametal Inc., Latrobe, PA (US)

(72) Inventors: Michael G. Morrison, East Huntingdon, PA (US); Jeremy Verellen, Jeanette, PA (US); Thomas J. Long, II, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 172 days.

(21) Appl. No.: 13/749,799

(22) Filed: Jan. 25, 2013

(65) Prior Publication Data
US 2014/0212225 A1 Jul. 31, 2014

(51) Int. Cl.
| | |
|---|---|
| B05B 1/04 | (2006.01) |
| B23Q 11/10 | (2006.01) |
| B23C 5/28 | (2006.01) |
| B23C 5/20 | (2006.01) |
| B05B 1/26 | (2006.01) |

(52) U.S. Cl.
CPC ............ B23C 5/28 (2013.01); B05B 1/044 (2013.01); B05B 1/26 (2013.01); B23C 5/20 (2013.01); B23Q 11/1076 (2013.01); *Y10T 407/14* (2015.01)

(58) Field of Classification Search
CPC ........................ B23B 27/10; B23Q 11/1023
USPC ............................................... 407/11
See application file for complete search history.

(56) References Cited

U.S. PATENT DOCUMENTS

| | | | | | |
|---|---|---|---|---|---|
| 2,647,801 | A | * | 8/1953 | Lycan | B05B 1/044 239/590.3 |
| 2,985,386 | A | * | 5/1961 | Steinen | B05B 1/042 239/597 |
| 3,913,167 | A | * | 10/1975 | Frigon | B60S 1/522 15/250.04 |
| 5,358,360 | A | | 10/1994 | Mai | |
| 5,709,907 | A | | 1/1998 | Battaglia et al. | |
| 5,722,803 | A | | 3/1998 | Battaglia et al. | |
| 6,045,300 | A | * | 4/2000 | Antoun | B23B 27/10 407/11 |
| 6,161,990 | A | | 12/2000 | Oles et al. | |
| 6,443,672 | B1 | * | 9/2002 | Lagerberg | B23B 27/10 407/11 |
| 6,705,805 | B2 | * | 3/2004 | Lagerberg | B23B 27/10 407/11 |

(Continued)

FOREIGN PATENT DOCUMENTS

| | | |
|---|---|---|
| DE | 197 25 100 A1 | 12/1998 |
| DE | 10 2009 041 812 A1 | 3/2011 |
| DE | 10 2010 046 312 A1 | 3/2011 |

OTHER PUBLICATIONS

English translation of Office Action by the German Patent Office of Nov. 20, 2014 for German Patent Application No. 10 2014 100 763.8 (5 pages).

(Continued)

*Primary Examiner* — Will Fridie, Jr.
(74) *Attorney, Agent, or Firm* — Ian K. Samways (57) ABSTRACT

A coolant spray nozzle for use in conjunction with a cutter with a coolant duct wherein the cutter retains a cutting insert with a cutting edge that engages a workpiece at an insert-chip interface having a length. The coolant spray nozzle includes a coolant spray nozzle body containing a bore and an adjustable fan spray nipple having a slot with a slot opening through which coolant discharges in a fan-shaped coolant spray so as to impinge the insert-chip interface along substantially the entire length of the insert-chip interface.

20 Claims, 4 Drawing Sheets

(56) References Cited

U.S. PATENT DOCUMENTS

| | | |
|---|---|---|
| 7,625,157 B2 | 12/2009 | Prichard et al. |
| 8,696,253 B2* | 4/2014 | Amstibovitsky ....... B23B 27/10 |
| | | 407/11 |
| 2002/0127067 A1* | 9/2002 | Lagerberg ............. B23B 29/046 |
| | | 407/11 |
| 2003/0223831 A1 | 12/2003 | Viens |
| 2009/0214305 A1 | 8/2009 | Waggle et al. |
| 2010/0272529 A1 | 10/2010 | Rozzi et al. |
| 2010/0322722 A1* | 12/2010 | Lin ....................... B23B 27/007 |
| | | 407/11 |
| 2011/0076105 A1 | 3/2011 | Hideta |
| 2013/0078043 A1* | 3/2013 | Henry ................. B23B 27/1622 |
| | | 407/11 |

OTHER PUBLICATIONS

Machine Shop Practice, Industrial Press Inc., New York, New York (1981) pp. 199-204.

ASTE Tool Engineers Handbook, McGraw Hill Book Co., New York, New York (1949) pp. 302-315.

German Office Action of Nov. 20, 2014 for German Patent Application No. 10 2014 100 763.8 (5 pages).

* cited by examiner

COOLANT SPRAY NOZZLE AND CUTTER WITH COOLANT SPRAY NOZZLE

BACKGROUND OF THE INVENTION

The present invention relates to a coolant spray nozzle, which is useful as a component for a cutter for machining and metalworking including without limitation a chipforming metalworking operation, as well as the cutter using the coolant spray nozzle. More specifically, the present invention relates to a coolant spray nozzle, which is useful as a component for a milling cutter for machining and metalworking including without limitation a chipforming metalworking operation, as well as the milling cutter (e.g., a multi-pocket milling cutter) using the coolant spray nozzle. Still further, the present invention relates to a coolant spray nozzle, which is useful as a component for a cutter for machining and metalworking including without limitation a chipforming metalworking operation, as well as the cutter using the coolant spray nozzle, wherein there is the capability to facilitate enhanced delivery of coolant adjacent the interface between the cutting (or milling) insert and the workpiece (i.e., the insert-chip interface) to diminish excessive heat at the insert-chip interface in the chipforming removal of material from a workpiece.

Machining and metalworking operations typically include the use of a cutting insert that includes a cutting edge. During the machining and/or metalworking operation, the cutting edge of the cutting insert engages a workpiece at a location characterized as the insert-chip interface. The result is the removal of material from the workpiece in such a fashion to form chips of the workpiece material. Excessive heat at the insert-chip interface can negatively impact upon the overall efficiency of the machining and/or metalworking operation including without limitation a reduction or shortening of the useful tool life of the cutting insert.

In this regard, a chip generated from the workpiece can sometimes stick (e.g., through welding) to the surface of the cutting insert. The build up of chip material on the cutting insert in this fashion is an undesirable occurrence that can negatively impact upon the performance of the cutting insert, and hence, the overall material removal operation. A flow of coolant to the insert-chip interface will reduce the potential for such welding. It would therefore be desirable to reduce excessive heat at the insert-chip interface to eliminate or at least reduce build up of chip material.

As another example, in a chipforming material removal operation, there can occur instances in which the chips do not exit the region of the insert-chip interface when the chip sticks to the cutting insert. When a chip does not exit the region of the insert-chip interface, there is the potential that a chip will be re-cut. It is undesirable for the cutting insert to re-cut a chip already removed from the workpiece. A flow of coolant to the insert-chip interface will facilitate the evacuation of chips from the insert-chip interface thereby minimizing the potential that a chip will be re-cut.

There is an appreciation that a shorter useful tool life increases operating costs and decreases overall production efficiency. Excessive heat at the insert-chip interface contributes to the welding of chip material and re-cutting of chips, both of which are detrimental to production efficiency. There are readily apparent advantages connected with decreasing the heat at the insert-chip interface wherein one way to decrease the temperature is to supply coolant to the insert-chip interface.

One typical way coolant (or cooling fluid) is supplied to the insert-chip interface is by delivery through a passage to a discharge point near the insert-chip interface. For reasons like those set forth above, the cooling fluid serves to prolong the life of the cutting insert, and under certain conditions enables faster cutting or machining of the work piece, by reducing friction and assisting in heat transfer from the work piece to the cutting tool at the insert-chip interface. Heretofore, a number of different coolant delivery systems have been used to supply coolant to the insert-chip interface.

Some coolant delivery systems clamp an exterior tube onto the cutting tool holder to deliver cooling fluid to the cutting tool. While such a system can be inexpensive and easy to assemble, it is suffer drawbacks of being flimsy, easily damaged and incapable of discharging cooling fluid at the desired location, e.g., near the insert-chip interface. Another cooling fluid delivery system provides a coolant duct through the tool holder wherein the coolant duct discharges in an area near the insert-chip interface. However, correct sizing of the coolant ducts presents manufacturing challenges because drilling a long coolant duct with a small drill bit is difficult because the small bit often breaks thereby causing significant downtime and increasing cost. Further, small coolant ducts also take a long time to manufacture due to longer cycle times during the manufacturing operation. To offset the disadvantages with using small drill bits, a manufacturer can use a larger drill bit. Yet, the use of a larger drill bit results in a larger coolant duct that creates a lower system delivery pressure thereby causing poorer coolant delivery and less effective cooling at the insert-chip interface.

Still another coolant delivery system using a coolant spray nozzle is shown and described in United States Patent Application Publication No. US 2009/0214305 A1 for a COOLANT NOZZLES FOR MILLING CUTTER to Waggle et al. and assigned to Kennametal Inc. (the assignee of the present patent application). The structure shown in the Waggle et al. application uses a generally cylindrical coolant duct which terminates with a fixed coolant spray nozzle in the chip gnash of the milling cutter wherein the coolant nozzle sprays coolant in the direction of the insert-chip interface. While the Waggle et al. structure performs adequately, the coolant spray nozzle contains a generally cylindrical coolant bore so as to deliver a generally cylindrically-shape coolant stream. Even though the generally cylindrically-shaped coolant stream may widen to a certain extent after exiting the coolant spray nozzle, the generally cylindrically-shaped coolant stream may not impinge the entire length of the insert-chip interface and certainly does not impinge the entire length of the engaged cutting edge. The failure to impinge the entire length of the insert-chip interface, as well as the entire length of the engaged cutting edge, can result in a reduction in the life of the cutting insert including by means of a catastrophic failure of the cutting insert.

It becomes apparent that it would be highly desirable to provide a coolant spray nozzle, which is useful as a component for a cutter for machining and metalworking including without limitation a chipforming metalworking operation, as well as the cutter using the coolant spray nozzle, wherein there is the capability to facilitate enhanced delivery of coolant adjacent the interface between the cutting (or milling) insert and the workpiece (i.e., the insert-chip interface) by providing a coolant spray that impinges the entire length of the insert-chip interface, as well as the entire length (or substantially all of the entire length) of the engaged cutting edge. Such a coolant spray would diminish excessive heat at the insert-chip interface in the chipforming removal of material from a workpiece, and thereby increase the useful life of the cutting insert by reducing instances of welding chip material to the cutting insert and decreasing the re-cutting of chips, both of which are detrimental to production efficiency.

Further, it is also apparent that it would be highly desirable to provide a coolant spray nozzle, which is useful as a component for a cutter for machining and metalworking including without limitation a chipforming metalworking operation, as well as the cutter using the coolant spray nozzle, wherein there is the capability to facilitate enhanced delivery of coolant adjacent the interface between the cutting (or milling) insert and the workpiece (i.e., the insert-chip interface) by providing for the adjustment of the direction of the coolant spray that impinges the insert-chip interface so as to impinge the entire length of the insert-chip interface, as well as the entire length (or substantially all of the entire length) of the engaged cutting edge. Such a coolant spray would diminish excessive heat at the insert-chip interface in the chipforming removal of material from a workpiece, and thereby increase the useful life of the cutting insert by reducing instances of welding chip material to the cutting insert and decreasing the re-cutting of chips, both of which are detrimental to production efficiency.

In addition, the use of a coolant spray nozzle that provides for the adjustment of the direction of the coolant spray that impinges the insert-chip interface facilitates the ease of manufacturing the cutting body. In this regard, the threaded region of the coolant duct into which the coolant spray nozzle threads does not have to have clocked threads to make certain optimal flow is achieved because the adjustability feature allows for more latitude in the manufacture of the threads. The same holes true for the manufacture of the coolant duct in that there is flexibility in the location thereof due to the adjustability feature of the coolant spray nozzle.

SUMMARY OF THE INVENTION

In one form thereof, the invention is a coolant spray nozzle for use in conjunction with a cutter containing a coolant duct wherein the cutter retains a cutting insert with a cutting edge engaging a workpiece at an insert-chip interface having a length. The coolant spray nozzle comprises a coolant spray nozzle body containing a bore and an adjustable fan spray nipple having a slot with a slot opening through which coolant discharges in a fan-shaped coolant spray so as to impinge the insert-chip interface along substantially the entire length of the insert-chip interface.

In another form thereof, the invention is a coolant spray nozzle for use in conjunction with a milling cutter containing a coolant duct wherein the milling cutter retains a milling insert with a cutting edge engaging a workpiece at an insert-chip interface having a length. The coolant spray nozzle comprises a coolant spray nozzle body containing a bore. The coolant spray nozzle body has an enlarged nozzle head region containing a generally spherical chamber, and the generally spherical chamber receiving an adjustable fan spray nipple whereby there is an interference fit between the coolant spray nozzle body defining the generally spherical chamber and the adjustable fan spray nipple. The adjustable fan spray nipple is adjustable 360 degrees to a selected position relative to the coolant spray nozzle body. The adjustable fan spray nipple has a slot with a slot opening through which coolant discharges in a fan-shaped coolant spray so as to impinge the insert-chip interface along substantially the entire length of the insert-chip interface.

In yet another form thereof, the invention is a milling cutter assembly that comprises a milling cutter body containing a coolant duct, and the milling cutter body retaining a milling insert with a cutting edge wherein the cutting edge engaging a workpiece at an insert-chip interface having a length. A coolant spray nozzle that comprises a coolant spray nozzle body that contains a bore and an adjustable fan spray nipple having a slot with a slot opening through which coolant discharges in a fan-shaped coolant spray so as to impinge the insert-chip interface along substantially the entire length of the insert-chip interface.

BRIEF DESCRIPTION OF THE DRAWINGS

The following is a brief description of the drawings that form a part of this patent application.

DETAILED DESCRIPTION

The present invention relates to a coolant spray nozzle, which is useful as a component for a cutter for machining and metalworking including without limitation a chipforming metalworking operation, as well as the cutter using the coolant spray nozzle, wherein there is the capability to facilitate enhanced delivery of coolant adjacent the interface between the cutting (or milling) insert and the workpiece (i.e., the insert-chip interface) to diminish excessive heat at the insert-chip interface in the chipforming removal of material from a workpiece. In a chipforming material removal operation, the cutting insert engages a workpiece to remove material from a workpiece typically in the form of chips. A material removal operation that removes material from the workpiece in the form of chips typically is known by those skilled in the art as a chipforming material removal operation.

The book *Machine Shop Practice* [Industrial Press Inc., New York, N.Y. (1981)] by Moltrecht presents at pages 199-204 a description, inter alia, of chip formation, as well as different kinds of chips (i.e., continuous chip, discontinuous chip, segmental chip). Moltrecht reads [in part] at pages 199-200, "When the cutting tool first makes contact with the metal, it compresses the metal ahead of the cutting edge. As the tool advances, the metal ahead of the cutting edge is stressed to the point where it will shear internally, causing the grains of the metal to deform and to flow plastically along a plane called the shear plane . . . When the type of metal being cut is ductile, such as steel, the chip will come off in a continuous ribbon . . . ". Moltrecht goes on to describe formation of a discontinuous chip and a segmented chip.

As another example, the text found at pages 302-315 of the *ASTE Tool Engineers Handbook*, McGraw Hill Book Co., New York, N.Y. (1949) provides a lengthy description of chip formation in the metal cutting process. At page 303, the ASTE Handbook makes the clear connection between chip formation and machining operations such as turning, milling and drilling. The following patent documents discuss the formation of chips in a material removal operation: U.S. Pat. No. 5,709,907 to Battaglia et al. (assigned to Kennametal Inc.), U.S. Pat. No. 5,722,803 to Battaglia et al. (assigned to Kennametal Inc.), and U.S. Pat. No. 6,161,990 to Oles et al. (assigned to Kennametal Inc.).

Figure 1:
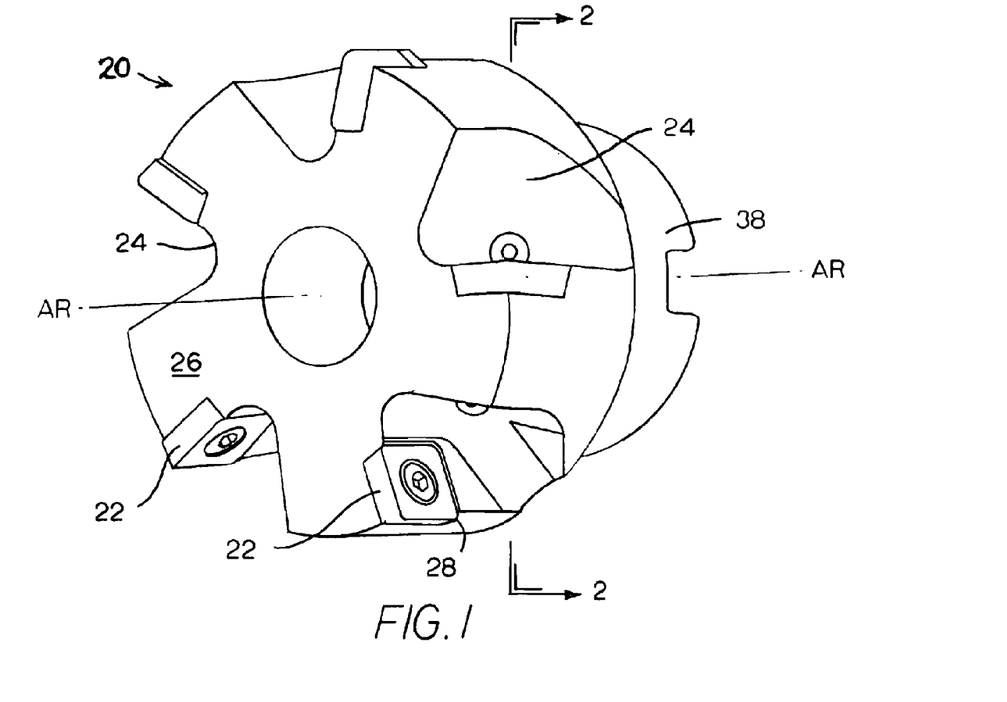
FIG. 1 is an isometric view of a first specific embodiment of a milling cutter with replaceable cutting (or milling) inserts and coolant spray nozzles according to a specific embodiment of the coolant spray nozzle of the present invention.

Referring to the drawings and in particular to FIG. 1, there is shown a specific embodiment of a milling cutter 20 with replaceable cutting inserts 22. The milling cutter 20 has a plurality of recesses 24 within the milling cutter body 26. The recesses 24 provide clearance for installation of cutting inserts 22, which are the cutting portion of the milling cutter 20 in that the cutting edge 28 of the cutting insert 22 engages the workpiece at the insert-chip interface, which is the location the cutting insert engages the workpiece. The cutting inserts 22 are often indexable, replaceable inserts made in whole or in part from, for example and without limitation, cemented carbides (e.g., tungsten (cobalt) cemented carbide that optionally can contain additives of titanium carbide, tantalum carbide and/or niobium carbide, ceramics (e.g., aluminum oxide, silicon aluminum oxynitride (SiAlON), superhard materials (e.g., cubic boron nitride) and cermets (e.g., titanium carbide-based materials).

Each recess 24 includes a seating surface 32 for seating of its corresponding cutting insert 22. The cutting insert 22 is held against the seating surface 32 by way of retention screw 34, which is threadedly engaged with an aperture 36 opening at the seating surface 32 of the milling cutter body 26. Projecting from the milling cutter body 26 is the shank 38 that operatively attaches to a rotating drive apparatus (not shown). The milling cutter 20 and rotating drive apparatus share a common axis of rotation illustrated by the dashed line AR-AR in FIG. 1. The shank 38 also provides a path for delivering coolant to the milling cutter 20. U.S. Pat. No. 7,625,157 B2 to Prichard et al. for a MILLING CUTTER AND MILLING INSERT WITH COOLANT DELIVERY shows and describes an exemplary milling cutter and milling cutter body.

Figure 2:
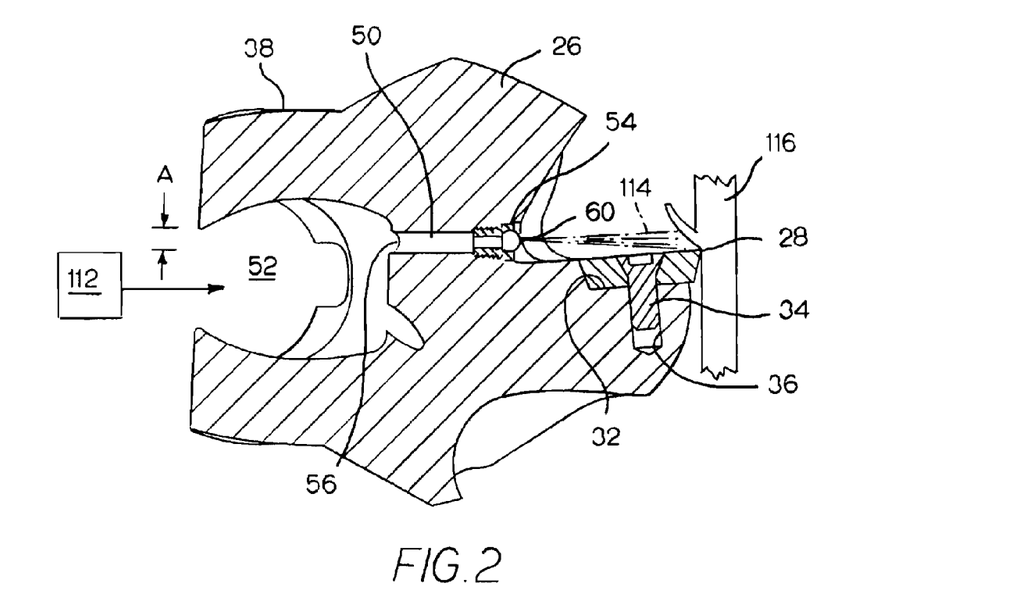
FIG. 2 is a cross-sectional view of the milling cutter shown in FIG. 1 along section line 2-2 of FIG. 1 and showing the cutting insert engaging the workpiece with a chip being generated from the workpiece.

Referring now to FIG. 2, which is a cross-sectional view of the milling cutter 20 of FIG. 1 taken along section line 2-2 that is along a center line of a coolant duct 50 contained in the milling cutter body 26. Coolant duct 50 has a diameter "A". The coolant duct 50 provides a passage for the travel of coolant from a centrally located coolant reservoir 52 within the milling cutter body 26 to the recess 24. The coolant reservoir 52 contains a supply of coolant. At the exit end 54 of the coolant duct 50 is a coolant spray nozzle 60, which is adjacent recess 24. The coolant duct 50 further has an entrance end 56 adjacent to or in the vicinity of the reservoir 52. Coolant spray nozzle 60 is shown in more detail in FIGS. 3 and 4.

As seen in FIG. 2, a countersunk portion transitions between the recess 24 and coolant duct 50 to allow clearance for the axial forward portion (or enlarged nozzle head region 68) of the coolant spray nozzle 60. Countersunk portion has an inside diameter greater than an inside diameter of the coolant duct 50 and at least as large as enlarged nozzle head region 68. In this manner, the enlarged nozzle head region 68 can be securely fastened against the countersunk portion. Additionally, countersunk portion provides protection for the coolant spray nozzle 60 preventing it from plugging or being damaged, for example, by metal chips or other debris. As used herein, the term "countersunk portion" refers to a hole with the top part enlarged so that a screw or bolt will fit into it and lie below the surface. A countersunk portion would include by way of example cylindrical and non-cylindrical counter bores and countersinks.

Figure 3:
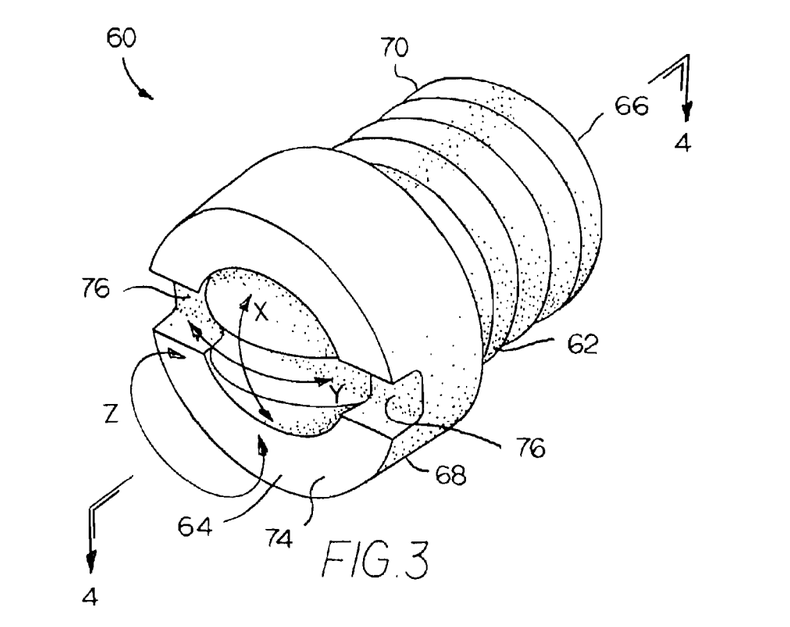
FIG. 3 is an isometric view of the specific embodiment of the coolant spray nozzle which is a component in the milling cutter of FIG. 1.
Figure 4:
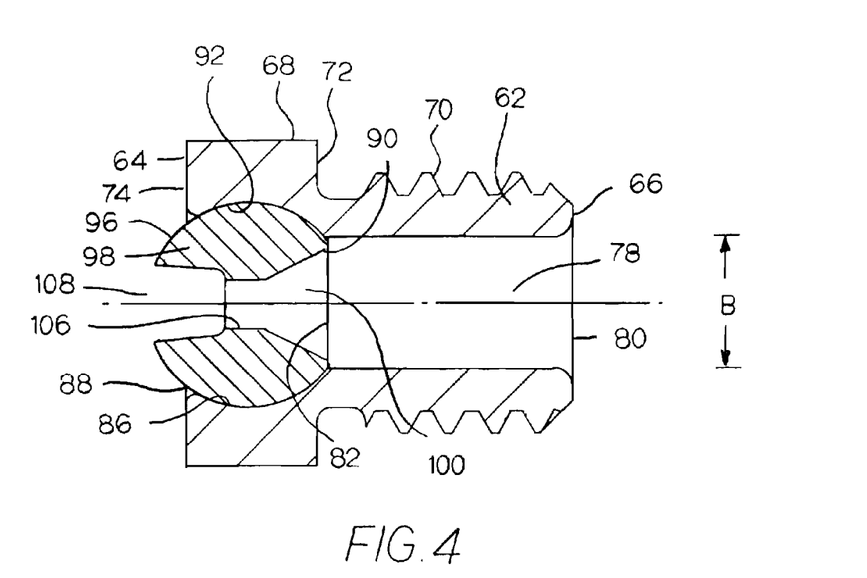
FIG. 4 is a cross-sectional view of the coolant spray nozzle of FIG. 3 taken along section line 4-4 of FIG. 3
Figure 5:
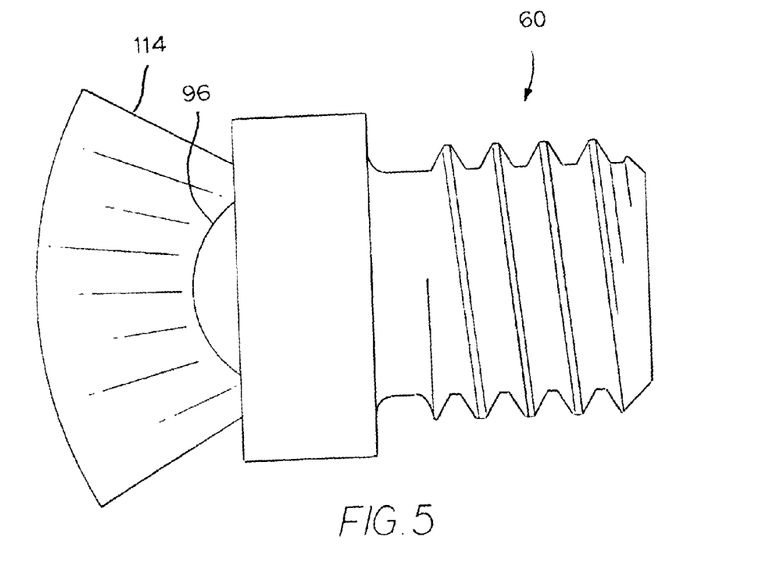
FIG. 5 is a top view of the coolant spray nozzle of FIG. 3 showing the fan-shaped coolant spray.

Referring to FIGS. 3, 4 and 5, coolant spray nozzle generally designated as 60 comprises a coolant spray nozzle body 62, which has an axial forward end 64 and an axial rearward end 66. The coolant spray nozzle body 62 has an enlarged nozzle head region 68 adjacent to the axial forward end 64 and a threaded shank region 70 adjacent to the axial rearward end 66. The coolant spray nozzle body 62 has an axial rearward facing shoulder 72 at the joinder of the enlarged nozzle head region 68 and the threaded shank region 70, and the coolant spray nozzle body 62 further has an axial forward face 74. Oppositely disposed recesses or notches 76 are in the axial forward face 74 of the coolant spray nozzle body 62. Notches 76 facilitate the tightening of the nozzle 62 to the milling cutter body 26 by receiving the blade of a screwdriver or the like.

The coolant spray nozzle body 62 contains a generally cylindrical bore 78, which has a diameter "B", with an entrance end 80 and an exit end 82. Diameter "B" of the generally cylindrical bore 78 is smaller as compared with the diameter "A" of the coolant duct 50. The coolant spray nozzle has a reduced diameter bore which restricts the relatively large diameter coolant duct to ensure fluid pressure is not lost and coolant is propelled to the cutting edge of the cutting insert. The coolant spray nozzle body 62 further has a generally spherical chamber 86 that has an axial forward end 88, an axial rearward end 90, and an arcuate side wall 92. The coolant spray nozzle 60 further contains an adjustable fan spray nipple 96 that has a generally spherical nipple body 98. The nipple body 98 contains a generally conical entrance passage 100 that communicates with a slot 106 that has a slot opening 108. Coolant spray nozzle 60 is typically threaded into the coolant duct 50. Liquid thread locking compound may be applied to the coolant spray nozzle 60 to ensure the coolant spray nozzle 60 is securely held in the coolant duct 50. This facilitates easy installation and removal of the coolant spray nozzle 60. While a threaded connection is preferred, it has been contemplated that a press fit, adhesive or welded connection could be used to retain the coolant nozzle within the coolant duct.

The adjustable fan spray nipple 96 is adjustable or movable within the generally spherical chamber 86 so as to be able to selectively direct the spray of coolant from the coolant spray nozzle 60. As represented by the three arrows X, Y and Z in FIG. 3, the adjustable fan spray nipple 96 can be adjusted 360 degrees to virtually any position to direct coolant to a desired location. This means that the adjustable fan spray nipple 96 is adjustable 360 degrees to a selected position relative to the coolant spray nozzle body 62 so that coolant discharges in a fan-shaped coolant spray so as to impinge the insert-chip interface along substantially the entire length of the insert-chip interface. The use of a coolant spray nozzle that provides for the adjustment of the direction of the coolant spray that impinges the insert-chip interface facilitates the ease of manufacturing the cutting body. In this regard, the threaded region of the coolant duct into which the coolant spray nozzle threads does not have to have clocked threads to make certain optimal flow is achieved because the adjustability feature allows for more latitude in the manufacture of the threads. The same holds true for the manufacture of the coolant duct in that there is flexibility in the location thereof due to the adjustability feature of the coolant spray nozzle.

In reference to the retention of the adjustable fan spray nipple 96 in position during the spraying of coolant, there is an interference fit between the adjustable fan spray nipple 96 and the portion of the coolant spray nozzle body 62 defining the generally spherical chamber 86. During the installation of the adjustable fan spray nipple 96 in the generally spherical chamber 86, the coolant spray nozzle body 62 will flex slightly so that the adjustable fan spray nipple 96 will enter and be retained within the generally spherical chamber 86. This flexure will create a constant pressure against the adjustable fan spray nipple 96 so as to retain it in position even during operation when under the pressure of coolant flow. Because the coolant flow has a low amount of restriction, the magnitude of the force acting against the adjustable fan spray nipple 96 is low so as to enable the flexing force of the interference fit to maintain the adjustable fan spray nipple 96 in position. As shown in FIG. 3, a portion of the slot 106 in the adjustable fan spray nipple 96 is axially rearward of the axial forward end 64 of the coolant spray nozzle body 62.

Referring to the operation of the first specific embodiment of the milling cutter using the coolant spray nozzle 60, the coolant is supplied under pressure from a coolant source 112 (shown in a schematic fashion) to flow into the coolant reservoir 52 from where the coolant flows into and through the coolant duct 50 into the coolant spray nozzle 60. The coolant flows through the generally cylindrical bore 78 of the coolant spray nozzle 60 and into the generally conical entrance passage 100 and then into the slot 106 whereby coolant discharges under pressure through the slot opening 108. FIG. 5 shows the fan-shaped coolant spray 114 of the coolant discharging from the coolant spray nozzle 60.

Referring back to FIG. 2, the fan-shaped coolant spray 114 impinges the intersection between the cutting edge 28 of the cutting insert 22 and the workpiece 116 wherein this insert-chip interface can be said to have a length. Coolant is thereby delivered to the insert-chip interface providing the advantages set forth above.

Figure 6:
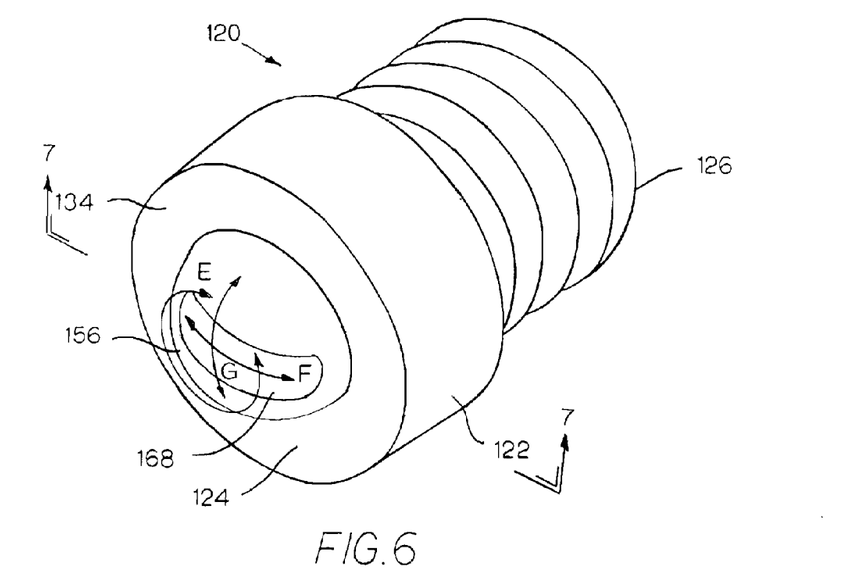
FIG. 6 is an isometric view of a second specific embodiment of the coolant spray nozzle which can be used a component in a milling cutter along the lines of that illustrated in FIG. 1.
Figure 7:
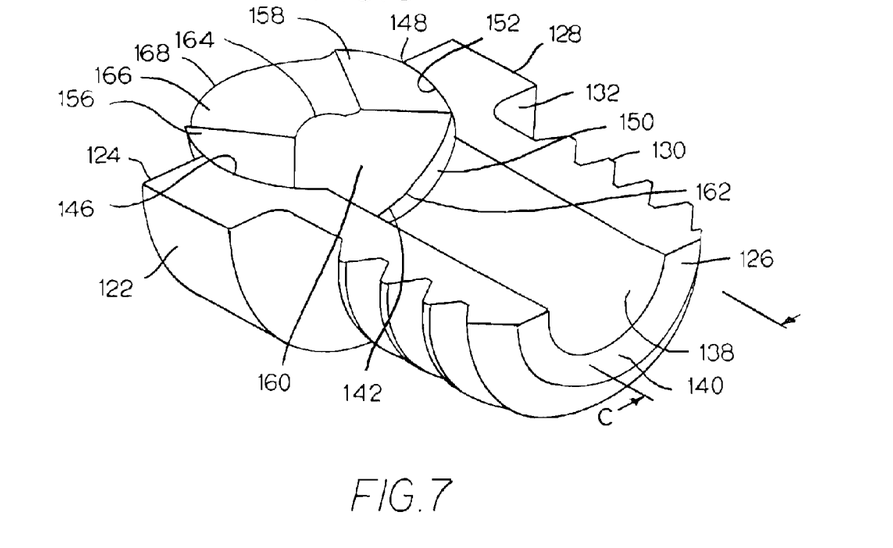
FIG. 7 is a cross-sectional isometric view of the coolant spray nozzle of FIG. 6 taken along section line 7-7 of FIG. 6.
Figure 8:
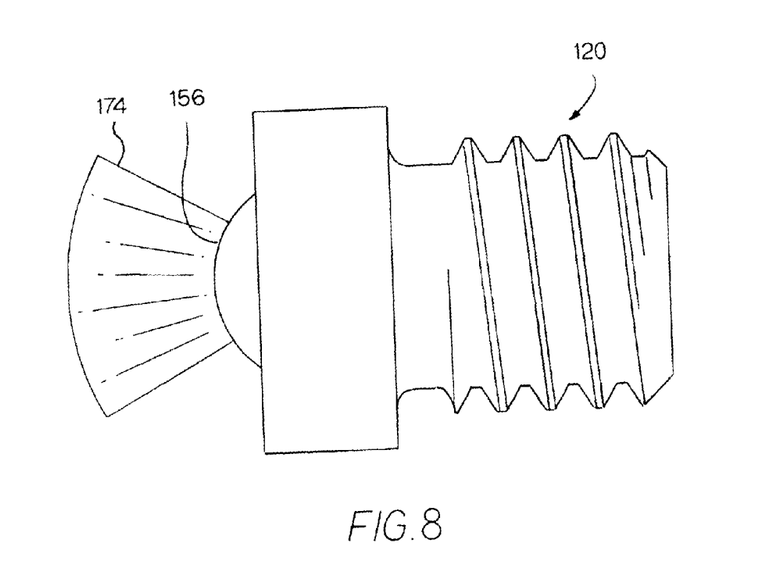
FIG. 8 is a top view of the coolant spray nozzle of FIG. 6 showing the fan-shaped coolant spray.

Referring to FIGS. 6 through 8, a second specific embodiment of a coolant spray nozzle generally designated as 120 comprises a coolant spray nozzle body 122, which has an axial forward end 124 and an axial rearward end 126. The nozzle body 122 has an enlarged head region 128 adjacent to the axial forward end 124 and a threaded shank region 130 adjacent to the axial rearward end 126. The nozzle body 122 has an axial rearward facing shoulder 132 at the joinder of the enlarged head region 128 and the threaded shank region 130, and the nozzle body 122 further has an axial forward face 134.

The nozzle body 122 contains a generally cylindrical bore 138, which has a diameter "C", which is smaller as compared with the diameter "A" of the coolant duct 50. The coolant spray nozzle has a reduced diameter bore which restricts the relatively large diameter coolant duct to ensure fluid pressure is not lost and coolant is propelled to the cutting edge of the cutting insert. The generally cylindrical bore 138 has an entrance end 140 and an exit end 142. The nozzle body 122 further has a generally spherical chamber 146 that has an axial forward end 148, an axial rearward end 150, and an arcuate side wall 152. The coolant spray nozzle 120 contains an adjustable fan spray nipple 156 that has a truncated spherical nipple body 158. The truncated spherical nipple body 158 contains a generally conical passage 160 with an entrance end 162 and an exit end 164, and the nipple body 158 further contains a slot 166 that has a slot opening 168. Coolant spray nozzle 120 is typically threaded into the coolant duct 50. Liquid thread locking compound may be applied to the coolant spray nozzle 120 to ensure the coolant spray nozzle 120 is securely held in the coolant duct 50. This facilitates easy installation and removal of the coolant spray nozzle 120. While a threaded connection is preferred, it has been contemplated that a press fit, adhesive or welded connection could be used to retain the coolant nozzles within the coolant ducts.

The adjustable fan spray nipple 156 is adjustable or movable within the generally spherical chamber 146 so as to be able to selectively direct the spray of coolant from the coolant spray nozzle 120. As represented by the three arrows E, F and G in FIG. 6, the adjustable fan spray nipple 156 can be adjusted 360 degrees to virtually any position to direct coolant to a desired location. This means that the adjustable fan spray nipple 156 is adjustable 360 degrees to a selected position relative to the coolant spray nozzle body 122 so that coolant discharges in a fan-shaped coolant spray so as to impinge the insert-chip interface along substantially the entire length of the insert-chip interface. The use of a coolant spray nozzle that provides for the adjustment of the direction of the coolant spray that impinges the insert-chip interface facilitates the ease of manufacturing the cutting body. In this regard, the threaded region of the coolant duct into which the coolant spray nozzle threads does not have to have clocked threads to make certain optimal flow is achieved because the adjustability feature allows for more latitude in the manufacture of the threads. The same holds true for the manufacture of the coolant duct in that there is flexibility in the location thereof due to the adjustability feature of the coolant spray nozzle.

In reference to the retention of the adjustable fan spray nipple 156 in position during the spraying of coolant, there is an interference fit between the adjustable fan spray nipple 156 and the portion of the nozzle body 122 defining the generally spherical chamber 146. During the installation of the adjustable fan spray nipple 156 in the generally spherical chamber 146, the nozzle body 122 will flex slightly so that the adjustable fan spray nipple 156 will enter and be retained within the generally spherical chamber 146. This flexure will create a constant pressure against the adjustable fan spray nipple 156 so as to retain it in position even during operation when under the pressure of coolant flow. Because the coolant flow has a low amount of restriction, the magnitude of the force acting against the adjustable fan spray nipple 156 is low so as to enable the flexing force of the interference fit to maintain the adjustable fan spray nipple 156 in position. As shown in FIG. 6, all of the slot 166 in the adjustable fan spray nipple 156 is axially forward of the axial forward end 124 of the coolant spray nozzle body 122.

Referring to the operation of the second specific embodiment of the coolant spray nozzle 120 when a component of a milling cutter, the coolant is supplied under pressure from a coolant source (not illustrated) to flow into the coolant reservoir 52 from where the coolant flows into and through the coolant duct 50 into the coolant spray nozzle 120. The coolant flows through the generally cylindrical bore 138 and into the generally conical passage 160 and then into the slot 166 whereby coolant discharges under pressure through the slot opening 168. FIG. 8 shows the fan-shaped coolant spray 174 of the coolant discharging from the coolant spray nozzle 120.

There should be the appreciation that either specific embodiment of the coolant spray nozzle (60, 120) provides a fan-shaped coolant spray (114, 174), and thus, provides the ability for the coolant spray that impinges the entire length of the insert-chip interface. Further, a coolant spray that impinges the entire length of the insert-chip interface diminishes excessive heat at the insert-chip interface in the chipforming removal of material from a workpiece, and thereby increases the useful life of the cutting insert by reducing instances of welding chip material to the cutting insert and decreases the re-cutting of chips, both of which are detrimental to production efficiency.

There should be an appreciation that any one of a number of different kinds of fluid or coolant are suitable for use with the coolant spray nozzle. Broadly speaking, there are two basic categories of fluids or coolants; namely, oil-based fluids which include straight oils and soluble oils, and chemical fluids which include synthetic and semisynthetic coolants. Straight oils are composed of a base mineral or petroleum oil and often contain polar lubricants such as fats, vegetable oils, and esters, as well as extreme pressure additives of chlorine, sulfur and phosphorus. Soluble oils (also called emulsion fluid) are composed of a base of petroleum or mineral oil combined with emulsifiers and blending agents Petroleum or mineral oil combined with emulsifiers and blending agents are basic components of soluble oils (also called emulsifiable oils). The concentration of listed components in their water mixture is usually between 30-85%. Usually the soaps, wetting agents, and couplers are used as emulsifiers, and their basic role is to reduce the surface tension. As a result they can cause a fluid tendency to foam. In addition, soluble oils can contain oiliness agents such as ester, extreme pressure additives, alkanolamines to provide Òeserve alkalinityÓ, a biocide such as triazine or oxazolidene, a defoamer such as a long chain organic fatty alcohol or salt, corrosion inhibitors, antioxidants, etc. Synthetic fluids (chemical fluids) can be further categorized into two subgroups: true solutions and surface active fluids. True solution fluids are composed essentially of alkaline inorganic and organic compounds and are formulated to impart corrosion protection to water. Chemical surface-active fluids are composed of alkaline inorganic and organic corrosion inhibitors combined with anionic non-ionic wetting agents to provide lubrication and improve wetting ability. Extreme-pressure lubricants based on chlorine, sulfur, and phosphorus, as well as some of the more recently developed polymer physical extreme-pressure agents can be additionally incorporated in this fluids. Semi-synthetics fluids(also called semi-chemical) contains a lower amount of refined base oil (5-30%) in the concentrate. They are additionally mixed with emulsifiers, as well as 30-50% of water. Since they include both constituents of synthetic and soluble oils, characteristics properties common to both synthetics and water soluble oils are presented.

It becomes apparent that the present invention provides a coolant spray nozzle, which is useful as a component for a cutter for machining and metalworking including without limitation a chipforming metalworking operation, as well as the cutter using the coolant spray nozzle, wherein there is the capability to facilitate enhanced delivery of coolant adjacent the interface between the cutting (or milling) insert and the workpiece (i.e., the insert-chip interface) by providing a coolant spray that impinges the entire length of the insert-chip interface, as well as the entire length (or substantially all of the entire length) of the engaged cutting edge. Such a coolant spray would diminish excessive heat at the insert-chip interface in the chipforming removal of material from a workpiece, and thereby increase the useful life of the cutting insert by reducing instances of welding chip material to the cutting insert and decreasing the re-cutting of chips, both of which are detrimental to production efficiency.

Further, it is also becomes apparent that the present invention provides a coolant spray nozzle, which is useful as a component for a cutter for machining and metalworking including without limitation a chipforming metalworking operation, as well as the cutter using the coolant spray nozzle, wherein there is the capability to facilitate enhanced delivery of coolant adjacent the interface between the cutting (or milling) insert and the workpiece (i.e., the insert-chip interface) by providing for the adjustment of the direction of the coolant spray that impinges the insert-chip interface so as to impinge the entire length of the insert-chip interface, as well as the entire length (or substantially all of the entire length) of the engaged cutting edge. Such a coolant spray would diminish excessive heat at the insert-chip interface in the chipforming removal of material from a workpiece, and thereby increase the useful life of the cutting insert by reducing instances of welding chip material to the cutting insert and decreasing the re-cutting of chips, both of which are detrimental to production efficiency.

The use of a coolant spray nozzle that provides for the adjustment of the direction of the coolant spray that impinges the insert-chip interface facilitates the ease of manufacturing the cutting body. In this regard, the threaded region of the coolant duct into which the coolant spray nozzle threads does not have to have clocked threads to make certain optimal flow is achieved because the adjustability feature allows for more latitude in the manufacture of the threads. The same holds true for the manufacture of the coolant duct in that there is flexibility in the location thereof due to the adjustability feature of the coolant spray nozzle.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A coolant spray nozzle for use in conjunction with a cutter containing a coolant duct wherein the cutter retains a cutting insert with a cutting edge engaging a workpiece at an insert-chip interface having a length, the coolant spray nozzle comprising:

a coolant spray nozzle body containing a bore and an adjustable fan spray nipple having a slot with a slot opening through which coolant discharges in a fan-shaped coolant spray so as to impinge the insert-chip interface along substantially the entire length of the insert-chip interface;

the adjustable fan spray nipple comprising a generally spherical nipple body;

the coolant spray nozzle body including a generally spherical chamber which accommodates the generally spherical nipple body of the adjustable fan spray nipple;

wherein the adjustable fan spray nipple is rotatably adjustable, along different planes of rotation, with respect to the coolant spray nozzle body.

2. The coolant spray nozzle according to claim 1 wherein the adjustable fan spray nipple is adjustable 360 degrees, with respect to each of three planes of rotation that are orthogonal with respect to one another.

3. The coolant spray nozzle according to claim 1, wherein:
the generally spherical nipple body of the adjustable fan spray nipple is accommodated in the generally spherical chamber via an interference fit; and
the interference fit retains the adjustable fan spray nipple in position during coolant discharge.

4. The coolant spray nozzle according to claim 3 wherein the adjustable fan spray nipple contains a generally conical entrance passage that receives coolant from the bore and directs the coolant through the generally conical entrance passage into the slot.

5. The coolant spray nozzle according to claim 1 wherein the coolant spray nozzle body has an axial forward end, and a portion of the slot of the adjustable fan spray nipple is axially rearward of the axial forward end of the coolant spray nozzle body.

6. The coolant spray nozzle according to claim 1 wherein the coolant spray nozzle body has an axial forward end, and all of the slot of the adjustable fan spray nipple is axially forward of the axial forward end of the coolant spray nozzle body.

7. A coolant spray nozzle for use in conjunction with a milling cutter containing a coolant duct wherein the milling cutter retains a milling insert with a cutting edge engaging a workpiece at an insert-chip interface having a length, and the coolant spray nozzle comprising:
a coolant spray nozzle body containing a bore and an adjustable fan spray nipple having a slot with a slot opening through which coolant discharges in a fan-shaped coolant spray so as to impinge the insert-chip interface along substantially the entire length of the insert-chip interface;
the adjustable fan spray nipple comprising a generally spherical nipple body;
the coolant spray nozzle body including a generally spherical chamber which accommodates the generally spherical nipple body of the adjustable fan spray nipple;
wherein the adjustable fan spray nipple is rotatably adjustable, along different planes of rotation, with respect to the coolant spray nozzle body;
the coolant spray nozzle body having an enlarged nozzle head region
the generally spherical nipple body of the adjustable fan spray nipple is accommodated in the generally spherical chamber via an interference fit; and
the interference fit retains the adjustable fan spray nipple in position during coolant discharge;
the adjustable fan spray nipple being adjustable 360 degrees, with respect to each of three planes of rotation that are orthogonal with respect to one another, to a selected position relative to the coolant spray nozzle body.

8. The coolant spray nozzle according to claim 7 wherein the coolant spray nozzle body has an axial forward end, and a portion of the slot of the adjustable fan spray nipple is axially rearward of the axial forward end of the coolant spray nozzle body.

9. The coolant spray nozzle according to claim 7 wherein the coolant spray nozzle body has an axial forward end, and all of the slot of the adjustable fan spray nipple is axially forward of the axial forward end of the coolant spray nozzle body.

10. A milling cutter assembly comprising:
a milling cutter body containing a coolant duct, and the milling cutter body retaining a milling insert with a cutting edge wherein the cutting edge engaging a workpiece at an insert-chip interface having a length;
a coolant spray nozzle comprising:
a coolant spray nozzle body containing a bore and an adjustable fan spray nipple having a slot with a slot opening through which coolant discharges in a fan-shaped coolant spray so as to impinge the insert-chip interface along substantially the entire length of the insert-chip interface;
the adjustable fan spray nipple comprising a generally spherical nipple body;
the coolant spray nozzle body including a generally spherical chamber which accommodates the generally spherical nipple body of the adjustable fan spray nipple;
wherein the adjustable fan spray nipple is rotatably adjustable, along different planes of rotation, with respect to the coolant spray nozzle body.

11. The milling cutter assembly according to claim 10 wherein the adjustable fan spray nipple is adjustable 360 degrees, with respect to each of three planes of rotation that are orthogonal with respect to one another.

12. The milling cutter assembly according to claim 10 wherein:
the generally spherical nipple body of the adjustable fan spray nipple is accommodated in the generally spherical chamber via an interference fit; and
the interference fit retains the adjustable fan spray nipple in position during coolant discharge.

13. The milling cutter assembly according to claim 12 wherein the adjustable fan spray nipple contains a generally conical entrance passage that receives coolant from the bore and directs the coolant through the generally conical entrance passage into the slot.

14. The milling cutter assembly according to claim 10 wherein the coolant spray nozzle body has an axial forward end, and a portion of the slot of the adjustable fan spray nipple is axially rearward of the axial forward end of the coolant spray nozzle body.

15. The milling cutter assembly according to claim 10 wherein the coolant spray nozzle body has an axial forward end, and all of the slot of the adjustable fan spray nipple is axially forward of the axial forward end of the coolant spray nozzle body.

16. The coolant spray nozzle according to claim 7 wherein the adjustable fan spray nipple contains a generally conical entrance passage that receives coolant from the bore and directs the coolant through the generally conical entrance passage into the slot.

17. The coolant spray nozzle according to claim 1, wherein the different planes of rotation are orthogonal with respect to one another.

18. The coolant spray nozzle according to claim 17, wherein the different planes of rotation comprise three planes of rotation that are orthogonal with respect to one another.

19. The coolant spray nozzle according to claim 1, wherein the generally spherical nipple body comprises a truncated spherical nipple body.

20. The coolant spray nozzle according to claim 4, wherein the conical entrance passage:
has a first end and a second end, wherein the second end is disposed adjacent to the slot; and
narrows from the first end toward the second end.

* * * * *